(12) United States Patent
Dillon, Jr.

(10) Patent No.: US 9,789,623 B2
(45) Date of Patent: Oct. 17, 2017

(54) METHOD AND APPARATUS FOR RELEASING LASER CUT WORK PIECES

(71) Applicant: Symmetry Medical Manufacturing, Inc., Warsaw, IN (US)

(72) Inventor: Richard Dillon, Jr., Manchester, NH (US)

(73) Assignee: Symmetry Medical Manufacturing, Inc., Warsaw, IN (US)

( * ) Notice: Subject to any disclaimer, the term of this patent is extended or adjusted under 35 U.S.C. 154(b) by 264 days.

(21) Appl. No.: 14/806,759

(22) Filed: Jul. 23, 2015

(65) Prior Publication Data

US 2016/0023368 A1 Jan. 28, 2016

Related U.S. Application Data

(60) Provisional application No. 62/029,365, filed on Jul. 25, 2014.

(51) Int. Cl.
*B26D 7/18* (2006.01)
*B23K 26/70* (2014.01)
*B23K 26/38* (2014.01)

(52) U.S. Cl.
CPC ............... *B26D 7/18* (2013.01); *B23K 26/38* (2013.01); *B23K 26/702* (2015.10)

(58) Field of Classification Search
CPC ............. B26D 7/18; B23K 26/70; B23K 26/38
USPC ............ 219/121.67, 121.72, 121.6; 700/166; 83/23, 453
See application file for complete search history.

(56) References Cited

U.S. PATENT DOCUMENTS

| 4,675,497 A * | 6/1987 | Pearl ................... B23K 26/0846 |
| | | 219/121.67 |
| 6,365,872 B1 * | 4/2002 | Arduino ................ B23K 26/38 |
| | | 219/121.6 |

* cited by examiner

*Primary Examiner* — Samuel M Heinrich
(74) *Attorney, Agent, or Firm* — Hayes Soloway PC

(57) ABSTRACT

A system, apparatus, and method for releasing laser cut work pieces from a sheet of metal are provided. The system includes a support structure supporting a sheet of metal. A work piece is laser cut within the sheet of metal without completely cutting the work piece from the sheet of metal. At least one bracing member is connected to the support structure, whereby the bracing member partially inhibits movement of the sheet of metal when the sheet of metal experiences vibrations. A vibration device is engaged with the sheet of metal. Vibrating the sheet of metal causes the work pieces to separate from the sheet of metal.

20 Claims, 9 Drawing Sheets

200

| A work piece is laser cut from a sheet of metal without completely cutting the work piece from the sheet of metal, wherein a minor piece of metal provides a connection between the work piece and the sheet of metal | — 202 |

| The connection is broken by vibrating the sheet of metal | — 204 |

FIG. 8

METHOD AND APPARATUS FOR RELEASING LASER CUT WORK PIECES

CROSS REFERENCE TO RELATED APPLICATION

This application claims benefit of U.S. Provisional Application Ser. No. 62/029,365 entitled, "Method and Apparatus for Releasing Laser Cut Work Pieces" filed Jul. 25, 2014, the entire disclosure of which is incorporated herein by reference.

FIELD OF THE DISCLOSURE

The present disclosure is generally related to laser cutting systems and more particularly is related to a system, apparatus, and method for releasing laser cut work pieces using vibration.

BACKGROUND OF THE DISCLOSURE

Within the manufacturing industry, laser-cutting machines are used to cut work pieces from sheet metal. Specifically, a sheet of metal, for instance having a four foot width, eight foot length, and a quarter inch thickness, may slide into a laser-cutting machine that cuts a hundred work pieces out of the sheet metal. After removal from the sheet of metal, the work pieces would then be used for manufacturing one or more objects. The work pieces then need to be delivered to the next location in the manufacturing assembly.

The machine may cut the work pieces over a basin or chute to deliver the work pieces to another location, although incorporating a chute within a laser-cutting machine presents its own challenges. The machine may output the cut sheet to a location where an individual or parts sorting robot removes the work pieces from the sheet for delivery to the next location on the assembly line, although the laser-cutting machine then cannot output another sheet until work pieces are removed and the cut sheet is removed, slowing work output—particularly when many work pieces are cut from an individual sheet.

Another possibility is cutting approximately 99% of each work piece such that each of the work pieces remains only slightly connected to the sheet. FIG. 1 is an illustration of a front view of a sheet of metal 10 laser cut with the work pieces 12 slightly connected to the sheet 10, in accordance with the prior art. The work piece 12 is separated from the sheet metal 10 by a laser cut 14, except at connection points 16 where the work piece remains tethered to the sheet metal. Depending on the design, there may be one or two, or more connection points 16. The sheet 10 with the work pieces 12 attached may be taken immediately from the laser-cutting machine to another location where the work pieces 12 are individually removed from the sheet 10. For example, an individual may manipulate the work piece 12 by bending the work piece 12 back and forth until the remaining connection 16 to the sheet 10 is severed. The manipulation may include pushing or twisting the work piece 12 relative to the sheet 10. This individual manipulation might require less than a minute for an individual work piece 12, but could take an hour for the sheet 10 if a hundred or more work pieces 12 are present on the sheet.

Thus, a heretofore unaddressed need exists in the industry to address the aforementioned deficiencies and inadequacies.

SUMMARY OF THE DISCLOSURE

Embodiments of the present disclosure provide a system, apparatus, and method for releasing laser cut work pieces from a sheet of metal. Briefly described, in architecture, one embodiment of the system, among others, can be implemented as follows. The system includes a support structure supporting the sheet of metal. At least one bracing member is connected to the support structure, whereby the bracing member partially inhibits movement of the sheet of metal when the sheet of metal experiences vibrations. A vibration device is engaged with the sheet of metal.

The present disclosure can also be viewed as providing an apparatus for releasing laser cut work pieces from a sheet of metal. Briefly described, in architecture, one embodiment of the system, among others, can be implemented as follows. The apparatus includes a body having a handle. A clamp is connected to the body, wherein the clamp is engagable with the sheet of metal. A vibration source is connected to the body, wherein a vibration is transferred from the vibration source through the clamp and into the sheet of metal.

The present disclosure can also be viewed as providing methods for releasing laser cut work pieces from a sheet of metal. In this regard, one embodiment of such a method, among others, can be broadly summarized by the following steps: laser cutting a work piece from a sheet of metal without completely cutting the work piece from the sheet of metal, wherein a minor piece of metal provides a connection between the work piece and the sheet of metal; and breaking the connection by vibrating the sheet of metal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a flowchart illustrating a method for releasing laser cut work pieces from a sheet of metal, in accordance with the first exemplary embodiment of the present disclosure.

DETAILED DESCRIPTION

Figure 1:
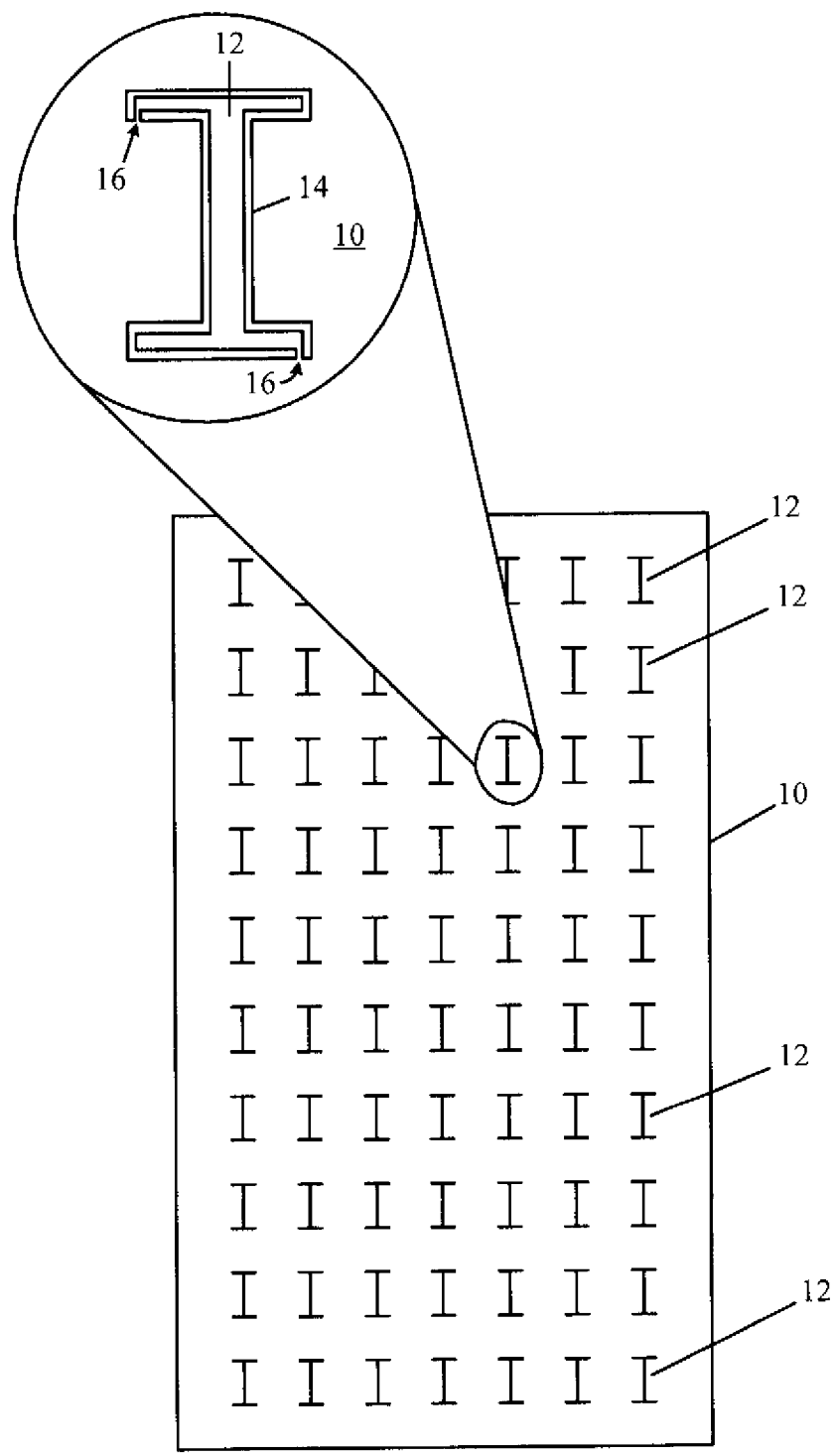
FIG. 1 is an illustration of a front view of a sheet of metal laser cut with the work pieces slightly connected to the sheet, in accordance with the prior art.
Figure 2:
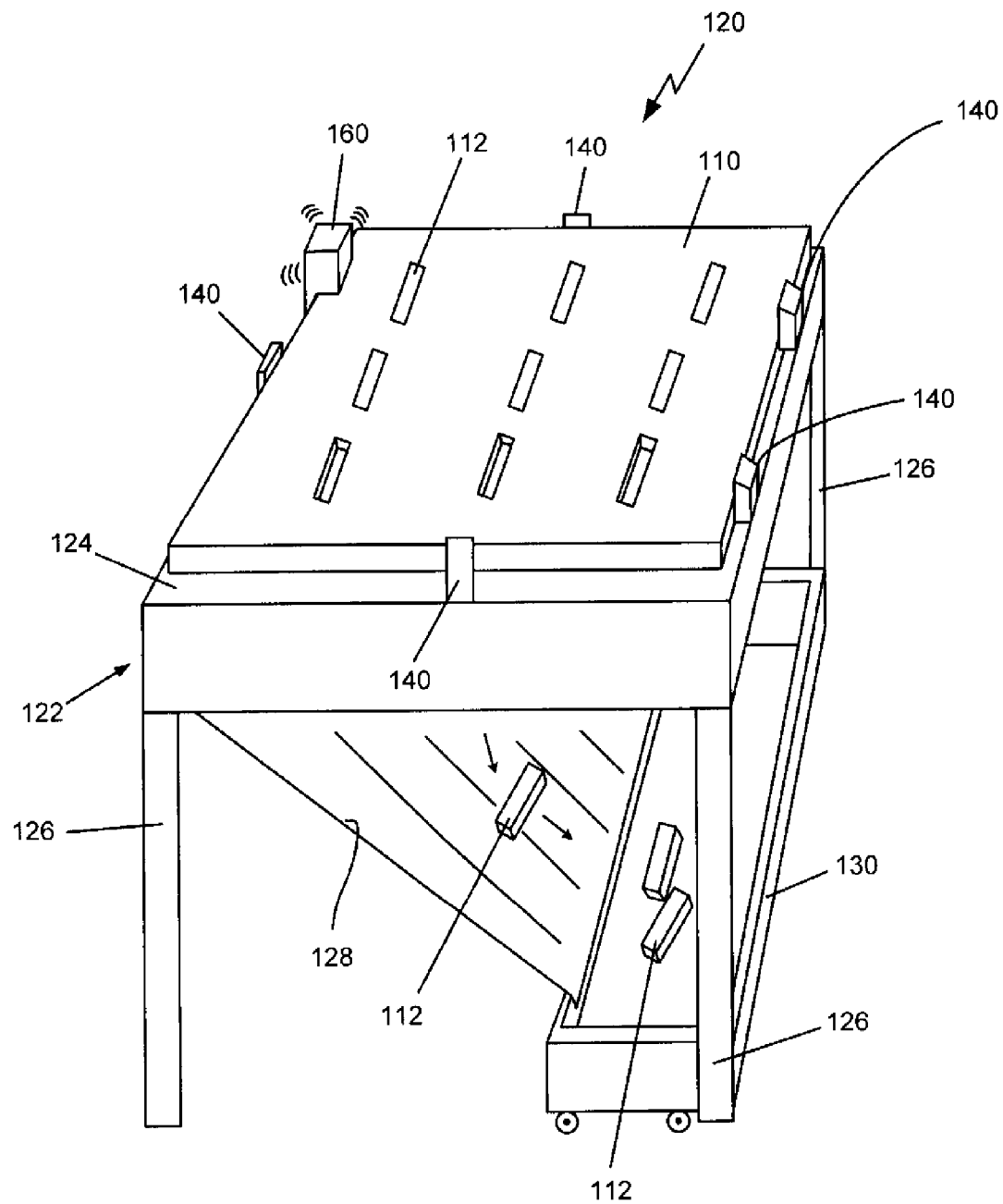
FIG. 2 is an isometric view illustration of a system for releasing laser cut work pieces from a sheet of metal, in accordance with a first exemplary embodiment of the present disclosure.

To improve on the shortcomings and inefficiencies of the prior art, the subject disclosure provides a system, apparatus, and method for removing work pieces that are laser cut from a sheet of metal using vibration. The use of vibration to remove work pieces may allow for the work pieces to be removed collectively, such that the inefficiencies of individual removal can be avoided. FIG. 2 is an illustration of a side view of a system for releasing laser cut work pieces from a sheet of metal 120, in accordance with a first exemplary embodiment of the present disclosure. The system for releasing laser cut work pieces from a sheet of metal 120, which may be referred to herein simply as 'system 120' includes a support structure 122 supporting the sheet of metal 110. At least one bracing member 140 is connected to the support structure 122 whereby the bracing member 140 partially inhibits movement of the sheet of metal 110 when the sheet of metal experiences vibrations. A vibration device 160 is engageable with the sheet of metal 110.

The support structure 122 may include a structure having sufficient durability to hold and carry the sheet of metal 110, which may have a substantial weight. For example, the support structure 122 may include a table frame 124 with legs 126 descending therefrom, where the sheet of metal 110 is able to be laid on the table frame 124. The table frame 124 may be sized large enough to fit all or a portion of the sheet of metal 110 on it. In FIG. 2, the sheet of metal 110 is shown fitting entirely on the table frame 124 but in some cases a portion of the sheet of metal 110 may extend off one or more sides of the table frame 124.

The support structure 122 may include at least one bracing member 140 that minimizes movement of the sheet of metal 110 when the sheet of metal is made to vibrate. The purpose of the bracing members 140 is to corral the sheet of metal 110 and prevent it from moving off of the support structure 122 as it vibrates. The bracing member 140 may include a variety of different devices or structures in various positions. For example, the bracing member 140 may include a heightened guide rail structure extending upwards from the table frame 124 about an edge of the table frame 124, whereby it can be positioned substantially along an edge of the table frame 124. This bracing member 140 may be tall enough to prevent the metal sheet 110 from moving above it as the metal sheet 110 is vibrated. There may be one or more bracing members 140 on each side of the table frame 124, or there may be sides of the table frame 124 which have no bracing member 140 thereon. The bracing member 140 may have a variety of widths, such as widths along a short or long portion of the edge of the table frame 124.

The bracing members 140 may also include brackets or a frame on a table frame 124 or similar support structure 122. The bracing members 140 may engage the sheet of metal, but engagement is not necessary. By not engaging the bracing members 140 with the sheet metal, a lower level of vibration may be translated from the sheet of metal to the bracing members 140 and the support structure 122, which may reduce wear on each element.

The vibration device 160 may include various types of devices used to initiate a mechanical vibration. In one example, the vibration device 160 may include a misaligned or offset rapidly rotating weight or other unbalanced mass which causes a vibration when rotated. The vibration device 160 may be temporarily affixed to the sheet of metal 110 such that the mechanical vibrations induced are transferred to the sheet of metal 110. The vibration device 160 may include a clamp or other feature to securely affix it to the sheet of metal 110. In some situations, the vibration device 160 may be integrally formed with the support structure 122 itself, such that the vibrations are transferred through the support structure 122 and into the sheet of metal 110.

In use, when the vibration device 160 is initiated, the connection between the work piece 112 and the sheet of metal 110 will be stressed by the vibrations and will eventually break. The work pieces 112 may fall into chute 128 or comparable structure which is positioned to collect work pieces 112 that fall from the sheet of metal 110. The chute 128 may be positioned proximate to a removable bin 130 or similar container, such that the work pieces 112 can contact the chute 128 and slide down into the removable bin 130, which may then be transported to a desired location for assembly. The support structure 122 may be integral with the laser cutting machine, such that a conveyer transports the sheet from a laser cutting location to the support structure 122, where the sheet of metal 110 is vibrated to release the work pieces 112. The sheet of metal 110 may then be conveyed to another location for disposal while the next laser cut sheet of metal 110 is transported to the support structure 122.

Figure 3:
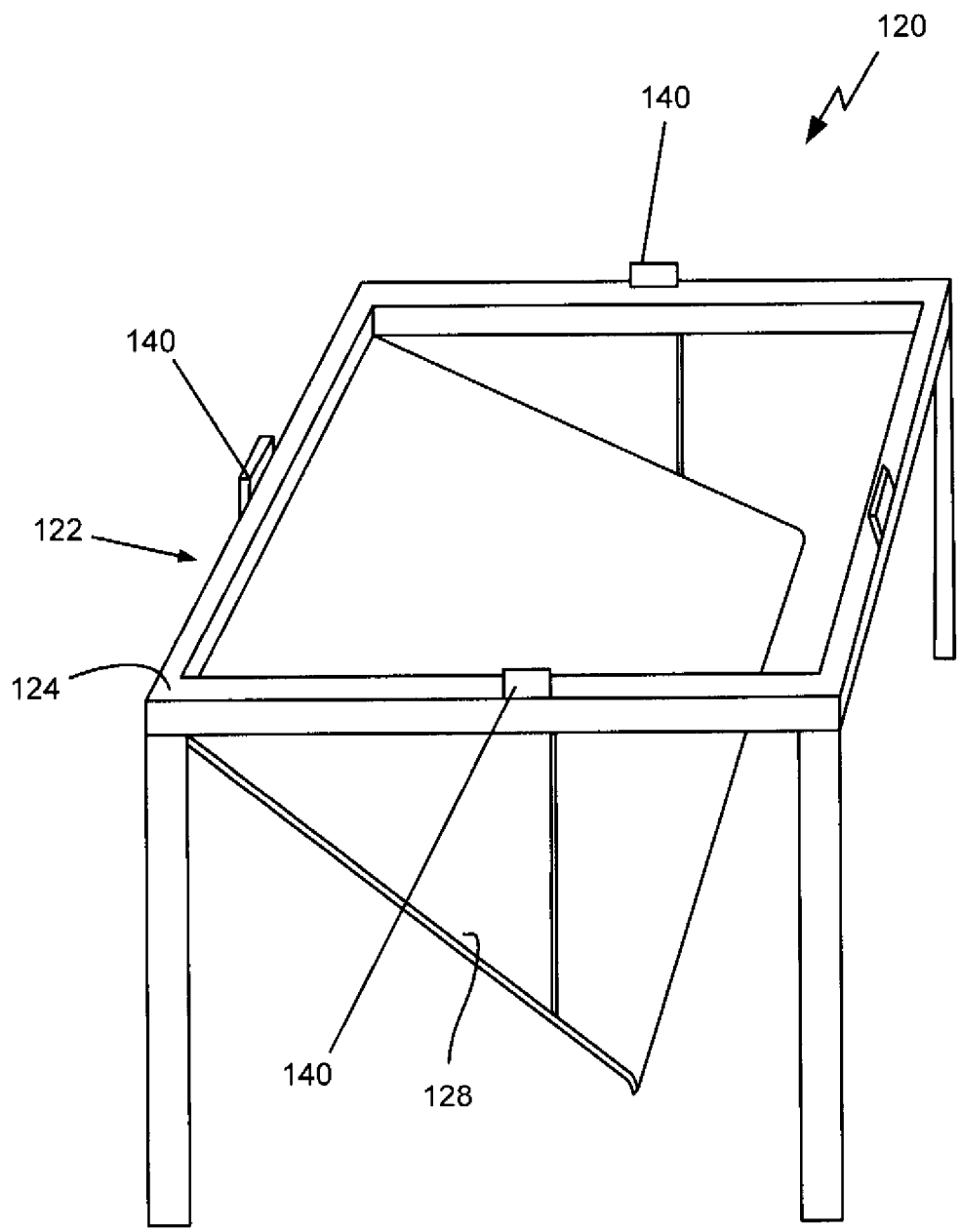
FIG. 3 is an isometric view illustration of a support structure and bracing elements of a system for releasing laser cut work pieces from a sheet of metal, in accordance with the first exemplary embodiment of the present disclosure.

FIG. 3 is an isometric view illustration of a support structure 122 and bracing elements 140 of system 120 for releasing laser cut work pieces from a sheet of metal, in accordance with the first exemplary embodiment of the present disclosure. As can be seen in FIG. 3, the support structure 122 may include a table frame 124 with an open interior portion, such that the work pieces on the sheet of metal can fall through the table frame 124 when vibrated. The open interior portion may include a variety of sizes and may have support structures positioned across the opening. For example, a brace or other structure can traverse the open interior portion without substantial interference with the work pieces falling through the open interior portion. Also readily visible in FIG. 3 is the chute 128 which is connected to an edge of the table frame 124. The chute 128 may have various angles and positions, and in some situations, can be adjustable to adjust the angle or position for particular work pieces or removable bins.

Figure 4:
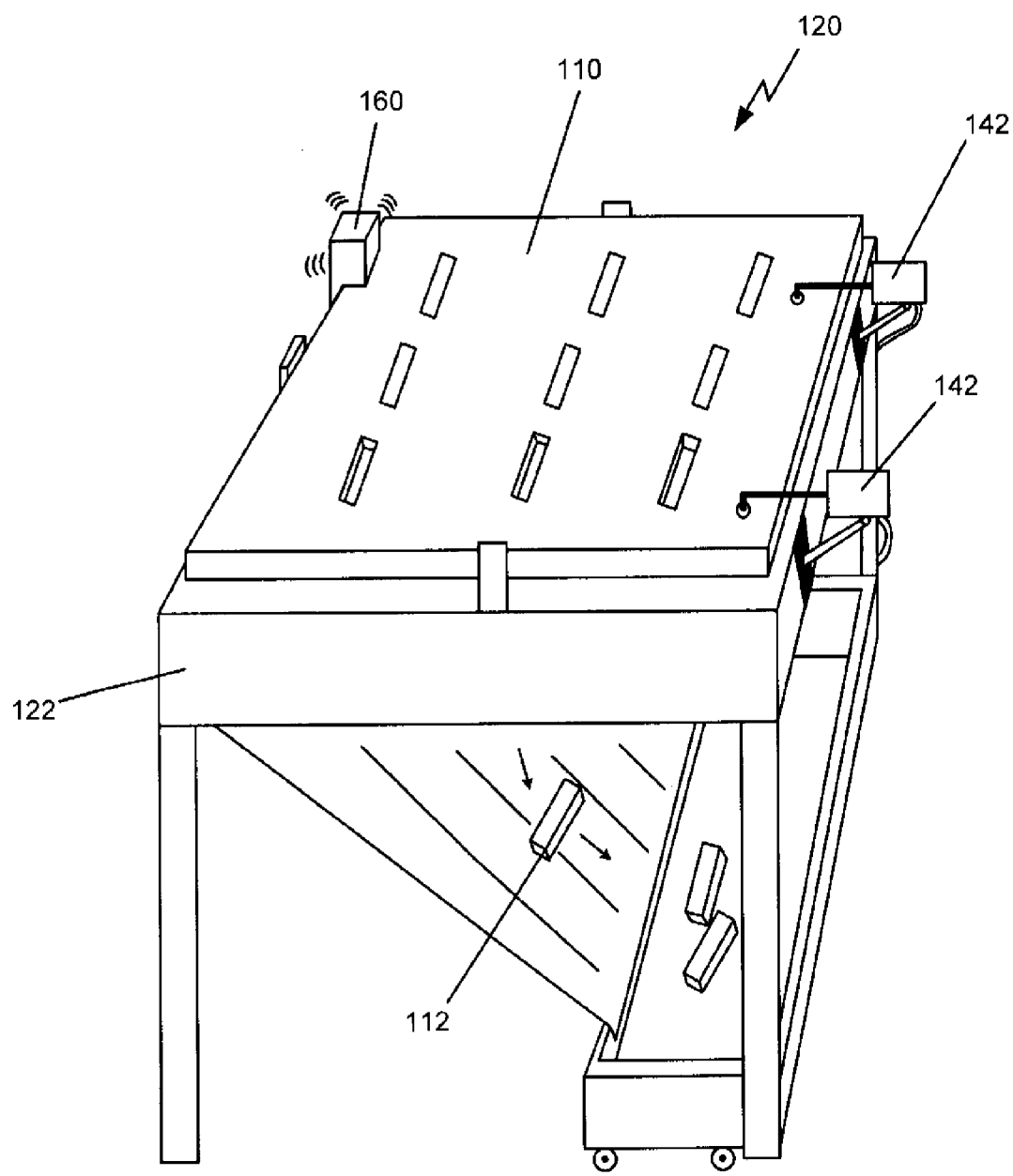
FIG. 4 is an isometric view illustration of a system for releasing laser cut work pieces from a sheet of metal, where the sheet of metal is restrained with clamps, in accordance with the first exemplary embodiment of the present disclosure.

FIG. 4 is an isometric view illustration of a system 120 for releasing laser cut work pieces 112 from a sheet of metal 110, where the sheet of metal is restrained with clamps 142, in accordance with the first exemplary embodiment of the present disclosure. As shown, the clamps 142 may be used to restrain the sheet of metal 110 to the support structure 122 by applying a downward force on the sheet of metal 110. The clamps 142 may be positioned proximate to an edge of the support structure 122, and in some designs, a plurality of clamps 142 may be used where all of the clamps 142 are positioned on a single edge of the support structure 122.

The clamp 142 or clamps 142 may be positioned proximate to a first side of the sheet of metal 110 with the vibration device 160 being positioned on the sheet of metal 110 at a second side, different from the first side. For example, the first side may be substantially opposite from the second side, thereby placing the width of the sheet of metal 110 between the clamps 142 and the vibration device 160. This configuration may allow for the proper vibrations of the sheet of metal 110 without excessively dampening the vibrations by the clamps 142, but at the same time, preventing the sheet of metal 110 from vibrating uncontrollably. The clamps 142 may include mechanical clamps 142 which are engaged using pneumatic (pressurized air), electrical, or another power source. The clamps 142 may be engaged individually or automatically, such as by actuating one pneumatic valve controlling the clamps 142. The clamps 142 may be used alone or in combination with other bracing elements 140.

Figure 5:
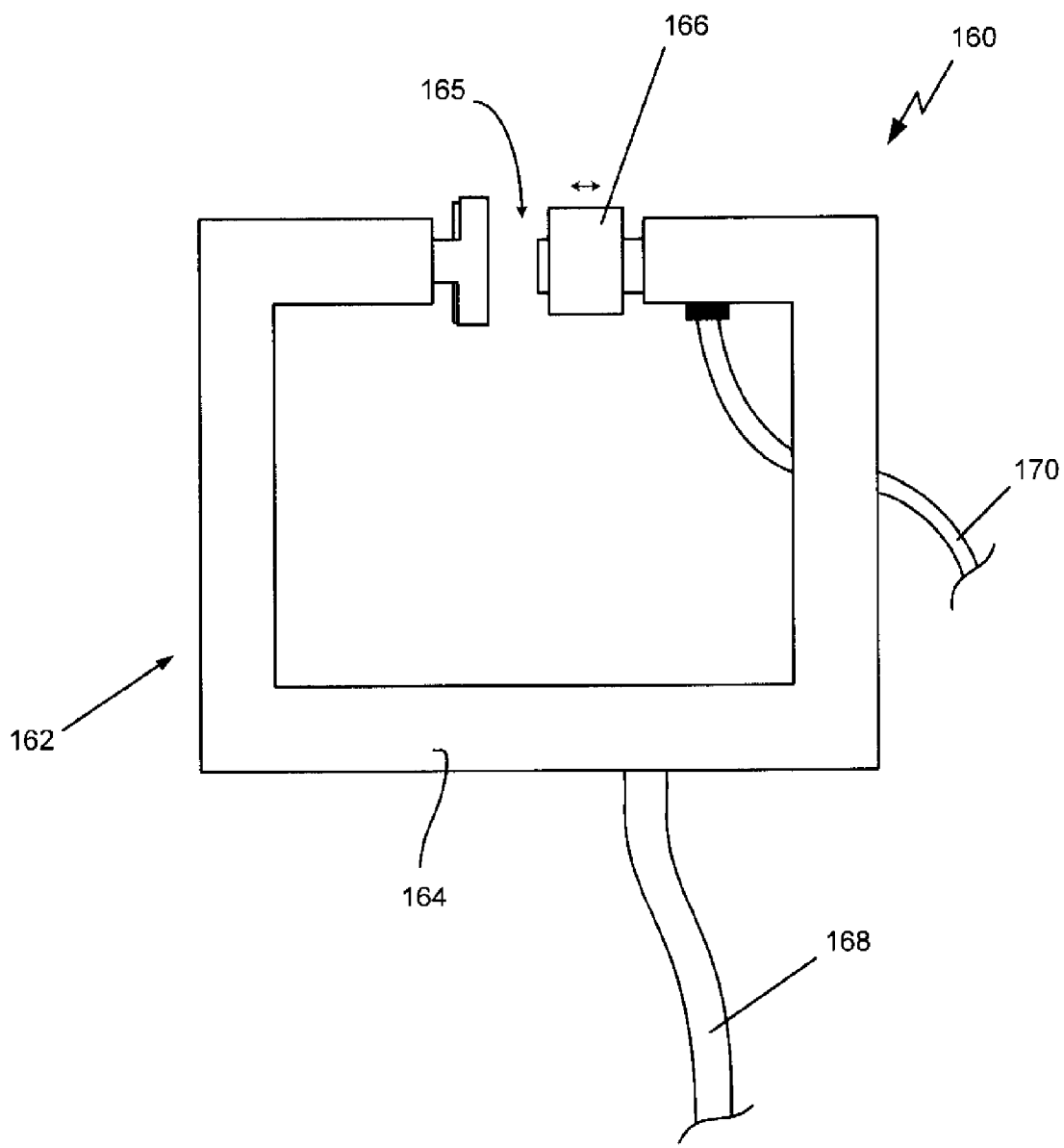
FIG. 5 is a side view illustration of a vibration device used in a system for releasing laser cut work pieces from a sheet of metal, in accordance with the first exemplary embodiment of the present disclosure.

FIG. 5 is a side view illustration of a vibration device 160 used in a system 120 for releasing laser cut work pieces from a sheet of metal, in accordance with the first exemplary embodiment of the present disclosure. The vibration device 160 may include a body 162 having a handle 164 which supports a clamp 166. As shown in FIG. 5, the handle 164 may be substantially U-shaped, such that a sheet of metal can be inserted through an opening 165 in the handle 164 to an open interior portion. The clamp 166 may be connected to the body at an edge of the opening, such that the clamp 166 can engage with the sheet of metal when it is positioned in the opening. The clamp 166 may be movable between various positions, such as open and closed positions, thereby allowing the clamp 166 to accommodate sheets of metal having different thicknesses. The clamp 166 may include an opposing structure to which the sheet of metal is biased against.

The vibration device 160 includes a vibration source providing the vibratory forces within the vibration device 160. In one example, the vibration source is an external vibrating machine which transfers the vibrations to the vibration device 160 using a connection 168, such as a mechanical link. The vibration source may include an electrically-powered vibration source which an operator can initiate. The vibration source can also be formed integral with the vibration device 160 such that an external connection 168 is not required. The clamp 166 may include a pneumatically-powered clamp 166 using a pneumatic line 170 and controls an engagement of the vibration device 160 with the sheet of metal.

Figure 6A:
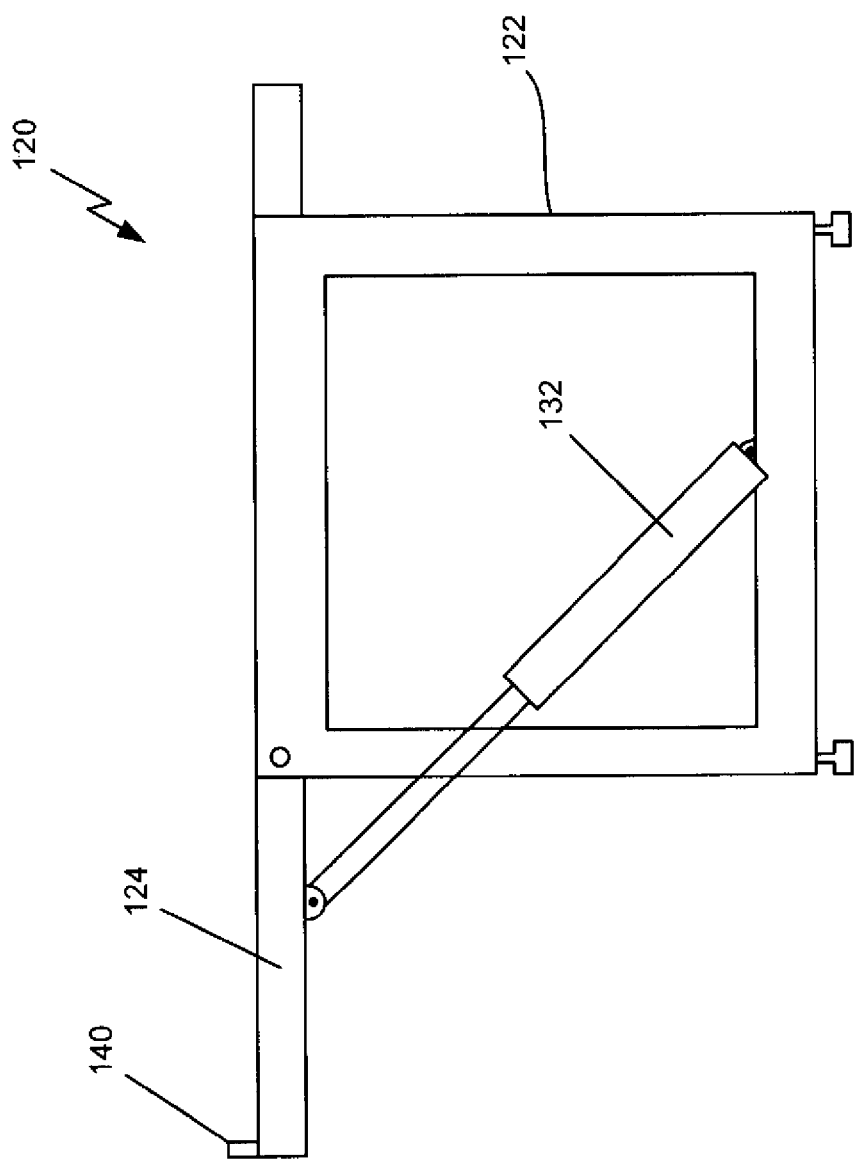
FIG. 6A is a side view illustration of a system for releasing laser cut work pieces from a sheet of metal, with a table of the support structure in a raised position, in accordance with the first exemplary embodiment of the present disclosure.
Figure 6B:
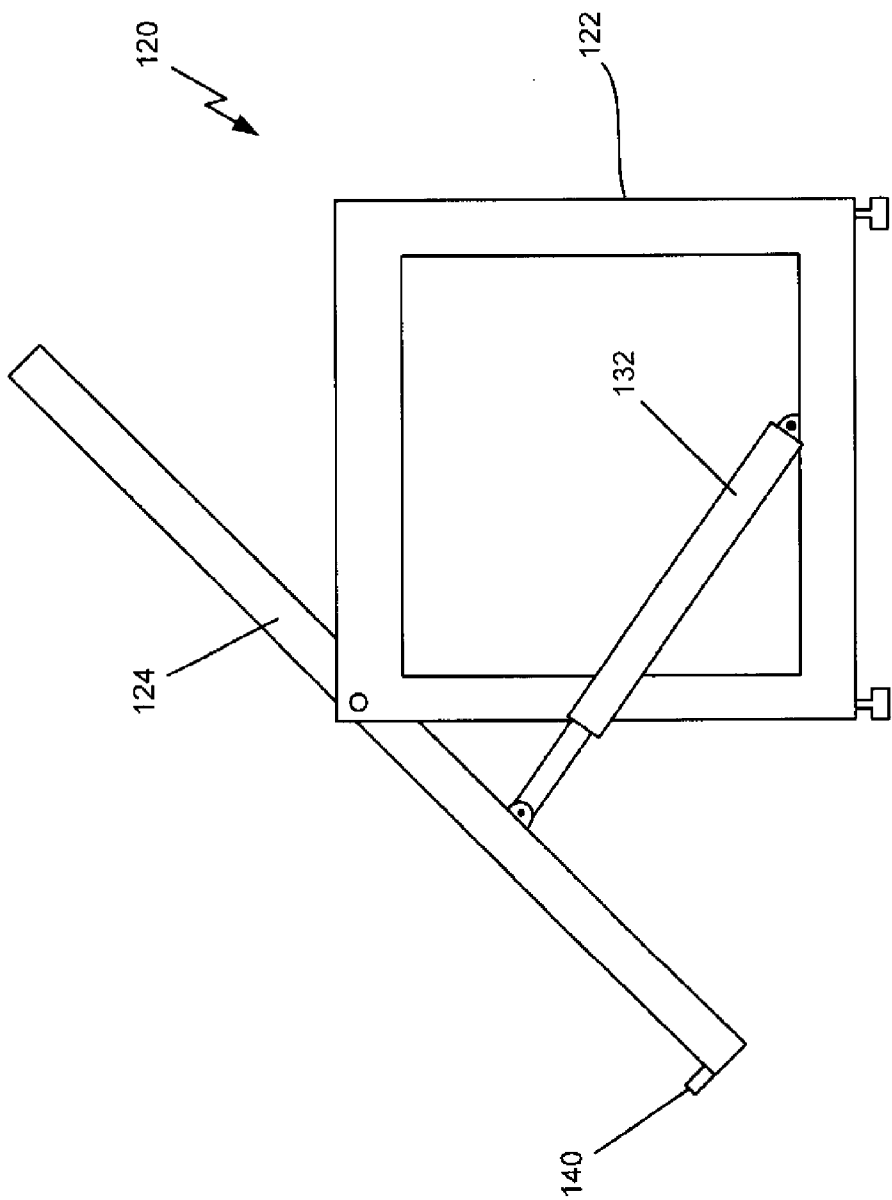
FIG. 6B is a side view illustration of a system for releasing laser cut work pieces from a sheet of metal, with a table of the support structure in a lowered position, in accordance with the first exemplary embodiment of the present disclosure.

FIG. 6A is a side view illustration of a system 120 for releasing laser cut work pieces from a sheet of metal, with a table of the support structure in a raised position, in accordance with the first exemplary embodiment of the present disclosure. FIG. 6B is a side view illustration of a system 120 for releasing laser cut work pieces from a sheet of metal, with a table of the support structure in a lowered position, in accordance with the first exemplary embodiment of the present disclosure. The support structure 122 may have a table frame 124 which is movable between positions, which may aid in manual placement of a sheet of metal on the support structure 122. For example, the table frame 124 may be movable between at least a first position and a second position, wherein the first position is a substantially horizontal position of the table structure 124, as shown in FIG. 6A, and the second position is an angled or non-horizontal position of the table structure 124, as shown in FIG. 6B. During a loading of the sheet of metal, the operator may configure the table structure 124 in the non-horizontal position of FIG. 6B, which allows the operator to manually rest an edge of the sheet of metal against the bracing element 140 in the lowered portion of the table structure 124. Then, the user may actuate the table structure 124 to move it to the substantially horizontal position of FIG. 6A. The movement of the table structure 124 may be controlled by a piston 132 or similar device, which may be electrically, pneumatically, or hydraulically controlled. It is noted that the specific angles of orientation may vary. For example, the table structure 124 may be configured to move to a fully or almost fully vertical position.

Figure 7:
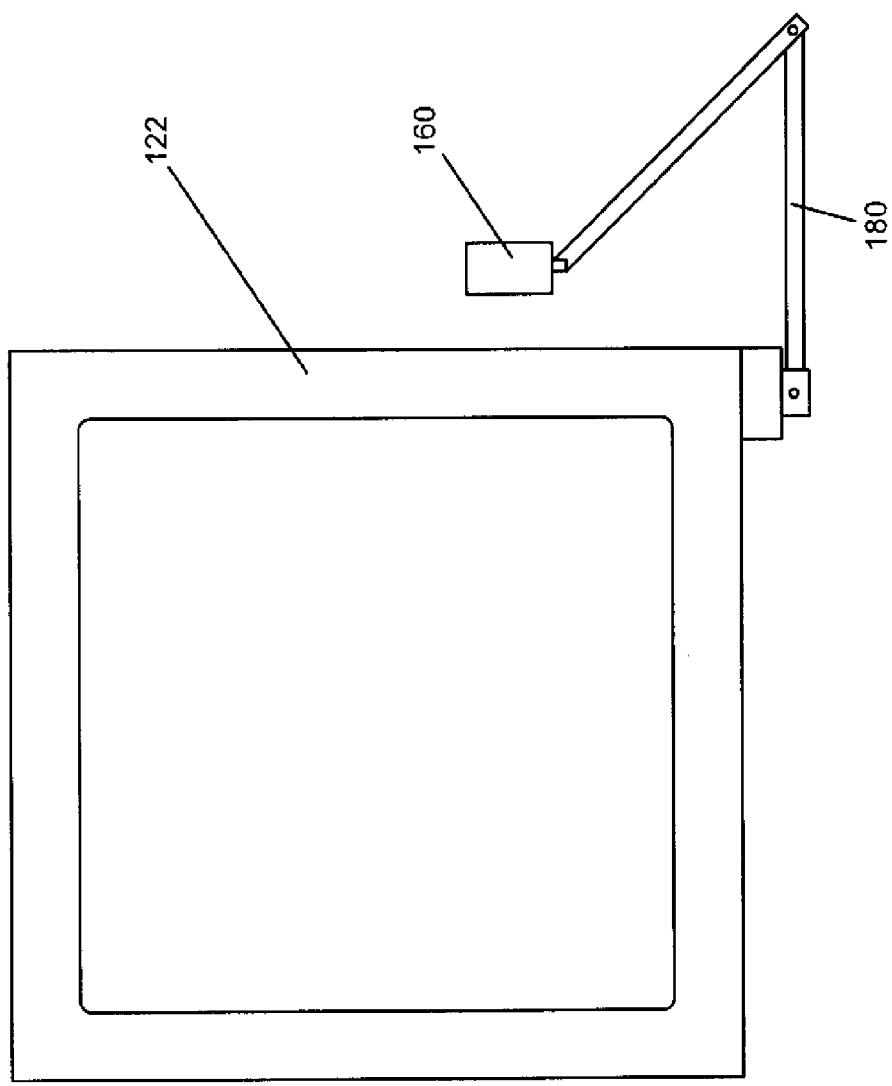
FIG. 7 is a side view illustration of a support arm in use with a system for releasing laser cut work pieces from a sheet of metal, in accordance with the first exemplary embodiment of the present disclosure.

FIG. 7 is a side view illustration of a support arm 180 in use with a system 120 for releasing laser cut work pieces from a sheet of metal, in accordance with the first exemplary embodiment of the present disclosure. The system 120 may include a support arm 180 connected to the support structure 122 to assist with movement and positioning of the vibration device 160. The support arm 180 may include a durable arm assembly which is connected to the support structure 122 and movably carries the vibration device 160. The support arm 180 may have a number of individual arm pieces or linkages which are interconnected using joints and pivoting interfaces. The support arm 180 may allow for the vibration device 160 to be positioned away from the edge of the support structure 122, such as when a sheet of metal is being loaded, and then moved to the edge of the support structure 122 to be engaged with the sheet of metal when it is properly positioned.

FIG. 8 is a flowchart 200 illustrating a method for releasing laser cut work pieces from a sheet of metal, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a work piece is laser cut from a sheet of metal without completely cutting the work piece from the sheet of metal, wherein a minor piece of metal provides a connection between the work piece and the sheet of metal. The connection is broken by vibrating the sheet of metal (block 204).

The method may further include any number of other steps, processes, or functions, including any disclosed herein. For example, the vibration device may be engaged or affixed to the sheet of metal to transfer a vibration from the vibration device to the sheet of metal. The sheet of metal may also be placed on a support structure which can hold the sheet of metal. The sheet of metal may be braced on the support structure with at least one bracing member connected to the support structure, whereby the bracing member partially inhibits movement of the sheet of metal when the sheet of metal is vibrated. Further, the sheet of metal may be clamped on at least a first side thereof to the support structure using a clamp. The vibration device may be engaged to the sheet of metal at a second side thereof, wherein the first side is different from the second side.

Breaking the connection by vibrating the sheet of metal may further include allowing the work piece to fall through an open interior portion of a support structure and contact a chute of the support structure. The support structure may include a table which is movable between at least a first position and a second position, wherein the first position further comprises a substantially horizontal position of the table and the second position further comprises a non-horizontal position of the table.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for releasing laser cut work pieces from a sheet of metal, comprising:
   a support structure supporting the sheet of metal;
   at least one bracing member connected to the support structure whereby the bracing member partially inhibits movement of the sheet of metal when the sheet of metal experiences vibrations; and
   a vibration device engageable with the sheet of metal.

2. The system for releasing laser cut work pieces from a sheet of metal of claim 1, wherein the vibration device further comprises a pneumatic clamp, wherein the pneumatic clamp controls an engagement of the vibration device with the sheet of metal.

3. The system for releasing laser cut work pieces from a sheet of metal of claim 1, wherein the support structure further comprises a table having an open interior portion.

4. The system for releasing laser cut work pieces from a sheet of metal of claim 1, wherein the table having the open interior portion is movable between at least a first position and a second position, wherein the first position further comprises a substantially horizontal position of the table and the second position further comprises a non-horizontal position of the table.

5. The system for releasing laser cut work pieces from a sheet of metal of claim 1, wherein the at least one bracing member further comprises a guide rail positioned proximate to an edge of the support structure.

6. The system for releasing laser cut work pieces from a sheet of metal of claim 1, wherein the at least one bracing member further comprises at least one clamp positioned proximate to an edge of the support structure.

7. The system for releasing laser cut work pieces from a sheet of metal of claim 6, wherein the at least one clamp further comprises a plurality of clamps, wherein all of the plurality of clamps are positioned on a single edge of the support structure.

8. The system for releasing laser cut work pieces from a sheet of metal of claim 6, wherein the at least one clamp is positioned proximate to a first side of the sheet of metal and wherein the vibration device is engageable with the sheet of metal at a second side of the sheet of metal, wherein the first side is different from the second side.

9. The system for releasing laser cut work pieces from a sheet of metal of claim 8, wherein the first side is substantially opposite from the second side.

10. The system for releasing laser cut work pieces from a sheet of metal of claim 1, wherein the support structure further comprises a chute positioned below the sheet of metal.

11. The system for releasing laser cut work pieces from a sheet of metal of claim 1, further comprising a support arm connected to the support structure, wherein the support arm movably carries the vibration device.

12. An apparatus for releasing laser cut work pieces from a sheet of metal, the apparatus comprising:
    a body having a handle;
    a clamp connected to the body, wherein the clamp is engagable with the sheet of metal;
    a vibration source connected to the body, wherein a vibration is transferred from the vibration source through the clamp and into the sheet of metal.

13. The apparatus for releasing laser cut work pieces from a sheet of metal of claim 12, wherein the clamp further comprises a pneumatically-powered clamp and the vibration source further comprises at least one of: an electrically-powered vibration source and a pneumatically-powered vibration source.

14. A method for releasing laser cut work pieces from a sheet of metal, the method comprising the steps of:
    laser cutting a work piece from a sheet of metal without completely cutting the work piece from the sheet of metal, wherein a minor piece of metal provides a connection between the work piece and the sheet of metal; and
    breaking the connection by vibrating the sheet of metal.

15. The method of claim 14, further comprising the step of engaging a vibration device to the sheet of metal.

16. The method of claim 14, further comprising:
    placing the sheet of metal on a support structure; and
    bracing the sheet of metal on the support structure with at least one bracing member connected to the support structure, whereby the bracing member partially inhibits movement of the sheet of metal when the sheet of metal is vibrated.

17. The method of claim 16, wherein bracing the sheet of metal on the support structure further comprises clamping the sheet of metal on at least a first side thereof to the support structure.

18. The method of claim 17, further comprising the step of engaging a vibration device to the sheet of metal at a second side thereof, wherein the first side is different from the second side.

19. The method of claim 14, wherein the step of breaking the connection by vibrating the sheet of metal further comprises allowing the work piece to fall through an open interior portion of a support structure and contact a chute of the support structure.

20. The method of claim 18, wherein the support structure further comprises a table, further comprising the step of moving the table between at least a first position and a second position, wherein the first position further comprises a substantially horizontal position of the table and the second position further comprises a non-horizontal position of the table.

* * * * *